(12) United States Patent
Wu et al.

(10) Patent No.: US 10,971,936 B2
(45) Date of Patent: Apr. 6, 2021

(54) RENEWABLE ENERGY GENERATION AND STORAGE SYSTEM USING CURRENT LOOP ADJUSTMENT

(71) Applicant: National Chung-Shan Institute of Science and Technology, Taoyuan (TW)

(72) Inventors: Chi-Sheng Wu, Taoyuan (TW); Gwo-Huei You, Taoyuan (TW); Jin-Kuan Chang, Changhua County (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 134 days.

(21) Appl. No.: 16/216,923

(22) Filed: Dec. 11, 2018

(65) Prior Publication Data
US 2020/0185924 A1   Jun. 11, 2020

(51) Int. Cl.
*H02J 7/00*    (2006.01)
*H02J 3/38*    (2006.01)
*H02J 3/32*    (2006.01)

(52) U.S. Cl.
CPC ............. *H02J 3/382* (2013.01); *H02J 3/32* (2013.01); *H02J 3/387* (2013.01)

(58) Field of Classification Search
CPC ...................................................... H02J 3/382
USPC ............................................................ 307/66
See application file for complete search history.

(56) References Cited

U.S. PATENT DOCUMENTS

| 8,493,020 B2 * | 7/2013 | Lee ................. | H02S 40/32 320/101 |
| 2012/0205985 A1 * | 8/2012 | Inakagata ........... | H02J 3/46 307/82 |

* cited by examiner

*Primary Examiner* — Rexford N Barnie
*Assistant Examiner* — Dru Parries
(74) *Attorney, Agent, or Firm* — Winston Hsu

(57) ABSTRACT

A renewable energy generation and storage system forms a current control loop for controlling a current charge operation and a current discharge operation to a plurality of energy storage cells at the same time. As a result, renewable energy from multiple sources may be stored while providing output voltage to a load, and therefore the renewable energy generation and storage system of the present invention may achieve energy generation and storage at the same time.

9 Claims, 1 Drawing Sheet

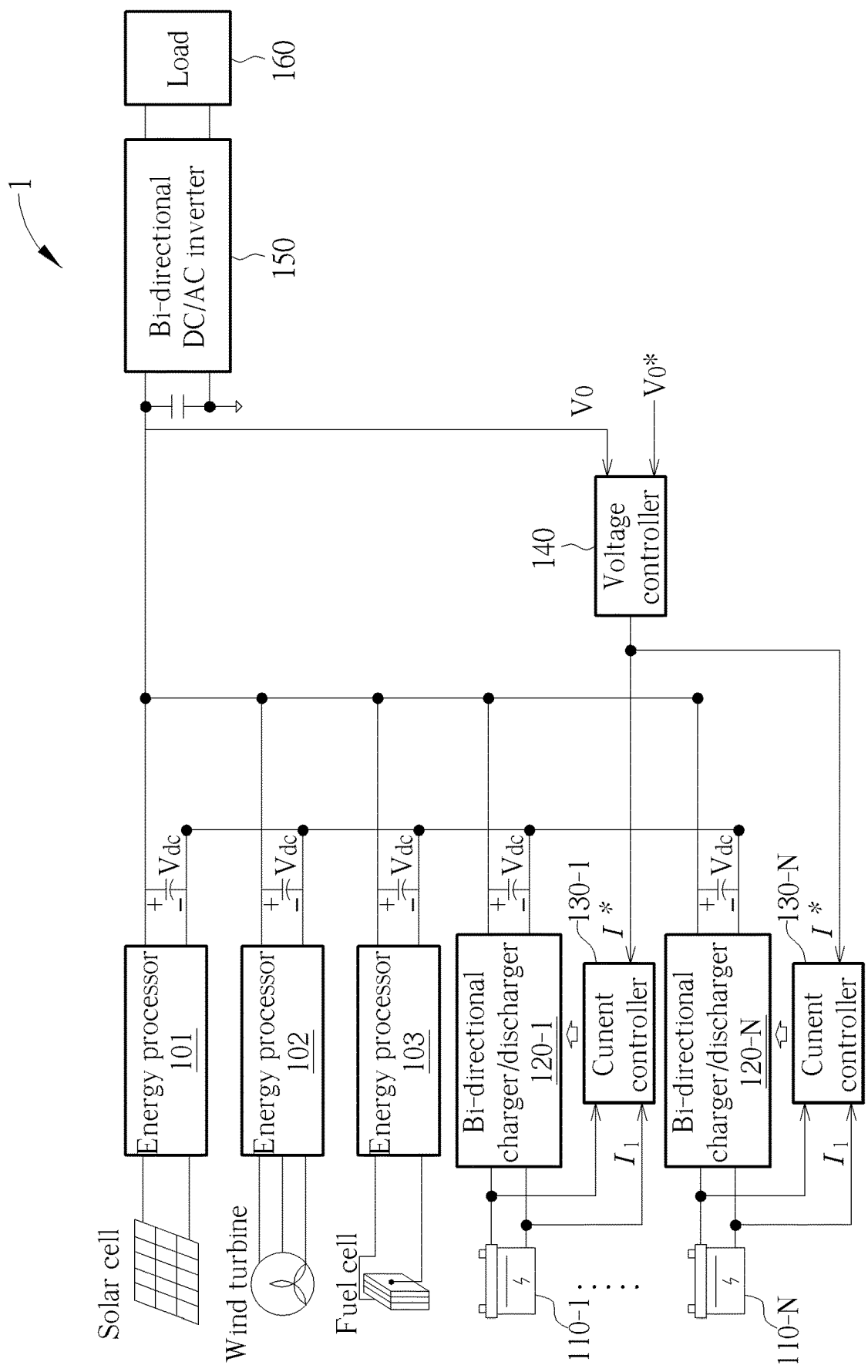

RENEWABLE ENERGY GENERATION AND STORAGE SYSTEM USING CURRENT LOOP ADJUSTMENT

BACKGROUND OF THE INVENTION

1. Field of the Invention

The present invention relates to a renewable energy generation and storage system, and more particularly, to a renewable energy generation and storage system using current loop adjustment.

2. Description of the Prior Art

Due to problems like environmental destruction and depletion of natural resources, systems for storing electricity and effectively utilizing the stored electricity are attracting more attention than before. Furthermore, the importance of new renewable energies, such as solar electricity, wind electricity, is increasing. Especially, since renewable energies are derived from natural resources, such as sunlight, wind, and tides, and do not create pollutions during energy consumption, methods of utilizing renewable energies are being actively researched and developed.

How to provide a renewable energy generation and storage system has always been a topic in the industry.

SUMMARY OF THE INVENTION

It is therefore an objective of the present invention to provide a renewable energy generation and storage system using current loop adjustment.

The present invention discloses a renewable energy generation and storage system includes a plurality of energy generation systems, a plurality of energy processors, a plurality of energy storage systems, a voltage controller, and a bi-directional current inverter. The plurality of energy generation systems is configured to generate a plurality of energies. The plurality of energy processors is coupled to the plurality of energy generation systems, and configured to convert the plurality of energies into a plurality of DC (direct current) voltages. The plurality of energy storage systems is coupled to the plurality of energy processors, and configured to store the plurality of DC voltages according to a plurality of charge currents and a reference current. The voltage controller is coupled to the plurality of energy storage system, and configured to generate the reference current according to a reference voltage and an output voltage. The bi-directional current inverter is coupled to the voltage controller and the plurality of energy storage systems, and configured to generate the output voltage according to the plurality of DC voltages.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIGURE is a schematic diagram of a renewable energy generation and storage system according to an embodiment of the present invention.

DETAILED DESCRIPTION

The FIGURE is a schematic diagram of a renewable energy generation and storage system 1 according to an embodiment of the present invention. The renewable energy generation and storage system 1 includes a plurality of energy generation systems, a plurality of energy processors 101, 102 and 103, a plurality of energy storage cells 110_1-110_N, a plurality of bi-directional chargers/dischargers 120_1-120_N, a plurality of current controllers 130_1-130_N, a voltage controller 140, a bi-directional current inverter 150, and a load 160.

The plurality of energy generation systems includes systems such as a solar cell energy generation system, a wind turbine energy generation system, a fuel cell energy generation system, and so on. The plurality of energy processors 101, 102 and 103 is coupled to the plurality of bi-directional chargers/dischargers 120_1-120_N, and configured to generate a plurality of DC (direct current) voltages $V_{dc}$ to the plurality of bi-directional chargers/dischargers 120_1-120_N. The plurality of bi-directional chargers/dischargers 120_1-120_N is coupled to the plurality of current controllers 130_1-130_N and the plurality of energy storage cells 110_1-110_N, and configured to charge or discharge the plurality of energy storage cells 110_1-110_N by the plurality of DC voltages $V_{dc}$ under the control of the plurality of current controllers 130_1-130_N.

In one embodiment, the energy storage cell 110_1, the bi-directional charger/discharger 120_1 and the current controller 130_1 form an energy storage system, which is configured to store the DC voltage $V_{dc}$ according to its charge current $I_1$ and a reference current $I^*$.

The plurality of current controllers 130_1-130_N is coupled to the voltage controller 140, and configured to control charge and discharge operations of the bi-directional chargers/dischargers 120_1-120_N according to the reference current $I^*$ and a plurality of the charge currents $I_1$ of the plurality of energy storage cells 110_1-110_N.

The voltage controller 140 is coupled to the plurality of current controllers 130_1-130_N and the bi-directional current inverter 150, and configured to generate the reference current $I^*$ according to an output voltage $V_O$ and a reference voltage $V_O^*$. The bi-directional current inverter 150 is coupled to the voltage controller 140 and the load 160, and configured to output the output voltage $V_O$ to the load 160, wherein the bi-directional current inverter 150 is coupled in parallel to a capacitor. One end of the capacitor and a negative input terminal of the bi-directional current inverter 150 are coupled to a system voltage or a ground of the renewable energy generation and storage system 1.

Take the solar cell energy generation system for example, the solar cell energy generation system generates solar energy to the energy processor 101, and the energy processor 101 converts the solar energy into the DC voltage $V_{dc}$. The bi-directional charger/discharger 120_1 is fed with the DC voltage $V_{dc}$ during the charge operation, and outputs the DC voltage $V_{dc}$ to the bi-directional current inverter 150 during the discharge operation. The voltage controller 140 generates the reference current $I^*$ to the current controller 130_1 according to the output voltage $V_O$ and the reference voltage $V_O^*$. The current controller 130_1 controls the charge and discharge operations of the bi-directional charger/discharger 120_1 according to the reference current $I^*$ and the charge currents $I_1$.

In other words, the current controller 130_1, the voltage controller 140 and the bi-directional current inverter 150 form a current control loop for adjusting the current charge and discharge operation to the energy storage cell 110_1. Therefore, during the current charge operation, the current controller 130_1 controls the bi-directional charger/discharger 120_1 to charge the energy storage cell 110_1 by the DC voltage $V_{dc}$ (more or less) converted from the solar energy generated by the solar cell energy generation system according to the reference current I* generated by the voltage controller 140 and the charge current $I_1$, wherein the reference current I* is generated according to the output voltage $V_O$ generated by the bi-directional current inverter 150 and the reference voltage $V_O$*.

During the current discharge operation, the current controller 130_1 controls the bi-directional charger/discharger 120_1 to discharge the energy storage cell 110_1 by the DC voltage $V_{dc}$ (more or less) converted from the solar energy generated by the solar cell energy generation system according to the reference current I* generated by the voltage controller 140 and the charge current $I_1$, wherein the reference current I* is generated according to the output voltage $V_O$ generated by the bi-directional current inverter 150 and the reference voltage $V_O$*.

Note that the energy processors 101-103 and the bi-directional chargers/dischargers 120_1-120_N are coupled in parallel. In detail, positive output terminals of the energy processors 101-103 and positive output terminals of the bi-directional chargers/dischargers 120_1-120_N are coupled to a positive input terminal of the bi-directional current inverter 150, and negative output terminals of the energy processors 101-103 are coupled to negative output terminals of the bi-directional chargers/dischargers 120_1-120_N.

In such a structure, when one of the energy processors (e.g., the energy processor 101) is outputting the DC voltage $V_{dc}$ to the load 160 through the bi-directional current inverter 150, the rest of the energy processors (e.g., the energy processors 102 and 103) may provide the DC voltage $V_{dc}$ to the plurality of energy storage cells 110_2-110_N under the charge operation of the bi-directional chargers/dischargers 120_2-120_N.

As a result, renewable energy from multiple sources may be stored while providing output voltage to the load, and therefore the renewable energy generation and storage system 1 may achieve energy generation and storage at the same time. Those skilled in art may make modifications and alterations accordingly, which is not limited in the embodiment of the present invention.

In one embodiment, the bi-directional current inverter 150 may be a DC (direct current) and AC (alternating current) inverter. A number N of the energy storage cells 110_2-110_N and the bi-directional chargers/dischargers 120_2-120_N may be any integer greater than 1. The load 160 is an AC load.

To sum up, the renewable energy generation and storage system of the present invention forms a current control loop (including the current controller 130_1, the voltage controller 140, and the bi-directional current inverter 150) for controlling and adjusting the current charge and discharge operation to the energy storage cells at the same time. As a result, renewable energy from multiple sources may be stored while providing output voltage to the load, and therefore the renewable energy generation and storage system of the present invention may achieve energy generation and storage at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A renewable energy generation and storage system, comprising:
   a plurality of energy generation systems configured to generate a plurality of energies;
   a plurality of energy processors coupled to the plurality of energy generation systems, and configured to convert the plurality of energies into a plurality of DC (direct current) voltages;
   a plurality of energy storage systems coupled to the plurality of energy processors, and configured to store the plurality of DC voltages according to a plurality of charge currents and a reference current;
   a voltage controller coupled to the plurality of energy storage system, and configured to generate the reference current according to a reference voltage and an output voltage; and
   a bi-directional current inverter coupled to the voltage controller and the plurality of energy storage systems, and configured to receive the output voltage and convert the output voltage to an AC (alternating current) power, wherein the output voltage is a compilation of the plurality of DC voltages;
   wherein the output voltage is an output DC voltage and the plurality of energy storage systems are configured to be separated from the voltage controller;
   wherein the voltage controller generates the single reference current only according to the reference voltage and the output voltage, to adjust charge operations and discharge operations of the plurality of energy storage systems at a same time according to the single reference current;
   wherein at least one of the plurality of energy processors outputs at least one DC voltage of the plurality of DC voltages through the bi-directional current inverter while at least rest one of the plurality of energy processors provides at least rest one DC voltage of the plurality of DC voltages to charge at least corresponding one of the plurality of energy storage systems;
   wherein the system further comprises a capacitor having one end coupled to a negative input terminal of the bi-directional current inverter and one of a system voltage and a ground, and another end coupled to a positive input terminal of the bi-directional current inverter, and a voltage at the another end of the capacitor is the output voltage.

2. The system of claim 1, wherein the plurality of energy generation systems comprises at least one of a solar cell energy generation system, a wind turbine energy generation system, and a fuel cell energy generation system.

3. The system of claim 1, wherein each of the plurality of energy storage systems comprises:
   a charger coupled to the one of the plurality of energy processors;
   an energy storage cell coupled to the charger for generating one of the plurality of charge currents; and
   a current controller coupled to the charger, and configured to control a current charge operation and a current discharge operation of the charger according to the reference current and the one of plurality of charge currents of the energy storage cell.

4. The system of claim 3, wherein during the current charge operation, the current controller controls the charger to charge the energy storage cell by the DC voltage according to the reference current generated by the voltage controller and the charge current, and the reference current is generated according to the output voltage and the reference voltage.

5. The system of claim 3, wherein during the current discharge operation, the current controller controls the charger to discharge the energy storage cell by the DC voltage according to the reference current generated by the voltage controller and the charge current, wherein the reference current is generated according to the output voltage and the reference voltage.

6. The system of claim 3, wherein the charger is a bi-directional charger/discharger.

7. The system of claim 3, the plurality of energy processors and the charger are coupled in parallel, positive output terminals of the plurality of energy processors and positive output terminals of the charger are coupled to a positive input terminal of the bi-directional current inverter, and negative output terminals of the plurality of energy processors are coupled to a negative output terminal of the charger.

8. The system of claim 1, wherein the bi-directional current inverter is a bi-directional DC (direct current) and AC (alternating current) inverter.

9. The system of claim 1, further comprising AC (alternating current) load coupled in parallel to the bi-directional current inverter.

\* \* \* \* \*